(12) United States Patent
Choi et al.

(10) Patent No.: US 11,791,487 B2
(45) Date of Patent: Oct. 17, 2023

(54) METHOD FOR OPTIMIZING PERFORMANCE IN FUEL CELL SYSTEM

(71) Applicant: HYUNDAI MOBIS CO., LTD., Seoul (KR)

(72) Inventors: Sung Kyung Choi, Yongin-si (KR); Jong Bo Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 168 days.

(21) Appl. No.: 17/357,282

(22) Filed: Jun. 24, 2021

(65) Prior Publication Data
US 2022/0231314 A1 Jul. 21, 2022

(30) Foreign Application Priority Data
Jan. 20, 2021 (KR) .................. 10-2021-0008345

(51) Int. Cl.
*H01M 8/04701* (2016.01)
*H01M 8/04029* (2016.01)
*H01M 8/04007* (2016.01)
*H01M 8/04858* (2016.01)
(Continued)

(52) U.S. Cl.
CPC ... *H01M 8/04723* (2013.01); *H01M 8/04029* (2013.01); *H01M 8/04067* (2013.01); *H01M 8/04358* (2013.01); *H01M 8/04768* (2013.01); *H01M 8/04947* (2013.01)

(58) Field of Classification Search
None
See application file for complete search history.

(56) References Cited

U.S. PATENT DOCUMENTS

| 6,651,761 B1 | 11/2003 | Hrovat et al. |
| 2016/0141645 A1 | 5/2016 | Yamada et al. |

FOREIGN PATENT DOCUMENTS

| CN | 112186298 A | 1/2021 |
| JP | 2004-288516 A | 10/2004 |
| JP | 2005-158558 A | 6/2005 |

(Continued)

OTHER PUBLICATIONS

Machine translation of JP 2004-288516, Oct. 2014.*
(Continued)

*Primary Examiner* — Jonathan Crepeau
(74) *Attorney, Agent, or Firm* — MORGAN, LEWIS & BOCKIUS LLP

(57) ABSTRACT

A fuel cell system includes a cooling fan that cools a coolant, a pump that pumps the coolant, and a controller communicatively connected with the cooling fan and the pump. The controller retrieves a preset cooling-fan RPM and a preset pump RPM, optimizes the cooling-fan RPM and the pump RPM through a decrease of the cooling-fan RPM and an increase of the pump RPM such that a coolant temperature at an inlet of a fuel cell stack satisfies a specified temperature condition and a total power consumption is minimized, the total power consumption being a sum of a power consumption corresponding to the cooling-fan RPM and a power consumption corresponding to the pump RPM, and stores the optimized cooling-fan RPM and the optimized pump RPM. Besides, it may be permissible to prepare various other embodiments speculated through the specification.

9 Claims, 11 Drawing Sheets

(51) Int. Cl.
*H01M 8/0432* (2016.01)
*H01M 8/04746* (2016.01)

(56) References Cited

FOREIGN PATENT DOCUMENTS

| | | |
|---|---|---|
| KR | 10-2012-0053137 A | 5/2012 |
| KR | 10-2012-0062270 A | 6/2012 |

OTHER PUBLICATIONS

Machine translation of KR 2012-0062270, Jun. 2014.*
Extended European Search Report issued in corresponding European Patent Application No. 21182486.7 dated Dec. 22, 2021.
Office Action issued in corresponding Korean Patent Application No. 10-2021-0008345 dated Dec. 20, 2022, with English translation.

* cited by examiner

METHOD FOR OPTIMIZING PERFORMANCE IN FUEL CELL SYSTEM

CROSS-REFERENCE TO RELATED APPLICATION

This application claims the benefit of priority to Korean Patent Application No. 10-2021-0008345, filed in the Korean Intellectual Property Office on Jan. 20, 2021, the entire contents of which are incorporated herein by reference.

TECHNICAL FIELD

The present disclosure relates to a technology for optimizing performance in a fuel cell system.

BACKGROUND

A fuel cell system may generate electrical energy using a fuel cell stack. For example, when hydrogen is used as a fuel for a fuel cell stack, it may be an alternative to solve global environmental problems, and therefore researches and developments of fuel cell systems have been consistently conducted. A fuel cell system may include a fuel cell stack that generates electrical energy, a fuel supply device that supplies a fuel (hydrogen) to the fuel cell stack, an air supply device that supplies, to the fuel cell stack, oxygen in air that is an oxidizing agent required for an electrochemical reaction, and a thermal management system (TMS) that releases heat of reaction of the fuel cell stack outside the system, controls an operating temperature of the fuel cell stack, and performs a water management function.

The thermal management system may be a kind of cooling device that circulates antifreeze, which serves as a coolant, through the fuel cell stack to maintain the fuel cell stack at an appropriate temperature (e.g., 60° C. to 70° C.). The thermal management system may include a TMS line through which a coolant circulates, a reservoir in which the coolant is stored, a pump that circulates the coolant, an ion filter that removes ions contained in the coolant, and a radiator that radiates heat of the coolant to the outside. In addition, the thermal management system may include a heater that heats the coolant and an HAVC unit (e.g., a heater for heating) that cools and heats the inside of a device (e.g., a vehicle) including the fuel cell system by using the coolant. The thermal management system may maintain appropriate temperatures of power electronic parts of a vehicle as well as the fuel cell stack.

SUMMARY

The fuel cell system may control a cooling fan and a pump to improve cooling performance. As the RPMs of the cooling fan and the pump increase, a cooling capacity in the fuel cell system may increase. However, power consumptions of the cooling fan and the pump may also increase due to the RPM increase. In particular, because the power consumption increase depending on the RPM increase has the form of a quadratic function, guarantee of cooling performance may cause deterioration in efficiency of the fuel cell system.

The present disclosure has been made to solve the above-mentioned problems occurring in the prior art while advantages achieved by the prior art are maintained intact.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fuel cell system includes a cooling fan that cools a coolant, a pump that pumps the coolant, and a controller communicatively connected with the cooling fan and the pump. The controller retrieves a preset cooling-fan RPM and a preset pump RPM, optimizes the cooling-fan RPM and the pump RPM through a decrease of the cooling-fan RPM and an increase of the pump RPM such that a coolant temperature at an inlet of a fuel cell stack satisfies a specified temperature condition and a total power consumption is minimized, the total power consumption being a sum of a power consumption corresponding to the cooling-fan RPM and a power consumption corresponding to the pump RPM, and stores the optimized cooling-fan RPM and the optimized pump RPM.

According to another aspect of the present disclosure, a method for operating a fuel cell system includes retrieving a preset cooling-fan RPM and a preset pump RPM, optimizing the cooling-fan RPM and the pump RPM through a decrease of the cooling-fan RPM and an increase of the pump RPM such that a coolant temperature satisfies a specified temperature condition and a total power consumption is minimized, the total power consumption being a sum of a power consumption corresponding to the cooling-fan RPM and a power consumption corresponding to the pump RPM, and storing the optimized cooling-fan RPM and the optimized pump RPM.

BRIEF DESCRIPTION OF THE DRAWINGS

The above and other objects, features and advantages of the present disclosure will be more apparent from the following detailed description taken in conjunction with the accompanying drawings.

With regard to description of the drawings, identical or similar reference numerals may be used to refer to identical or similar components.

DETAILED DESCRIPTION

Figure 1:
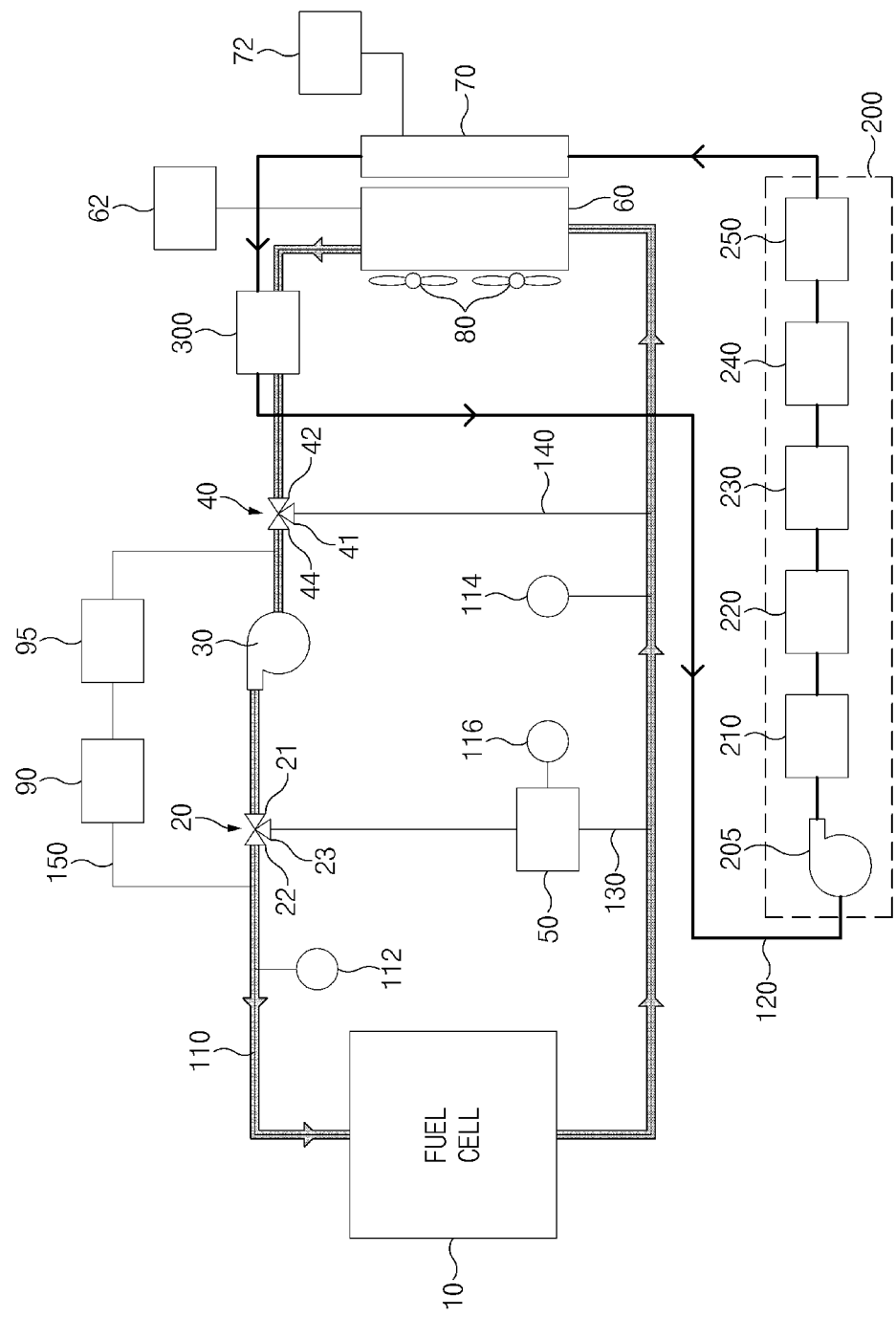
FIG. 1 illustrates a fuel cell system according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine. For example, the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
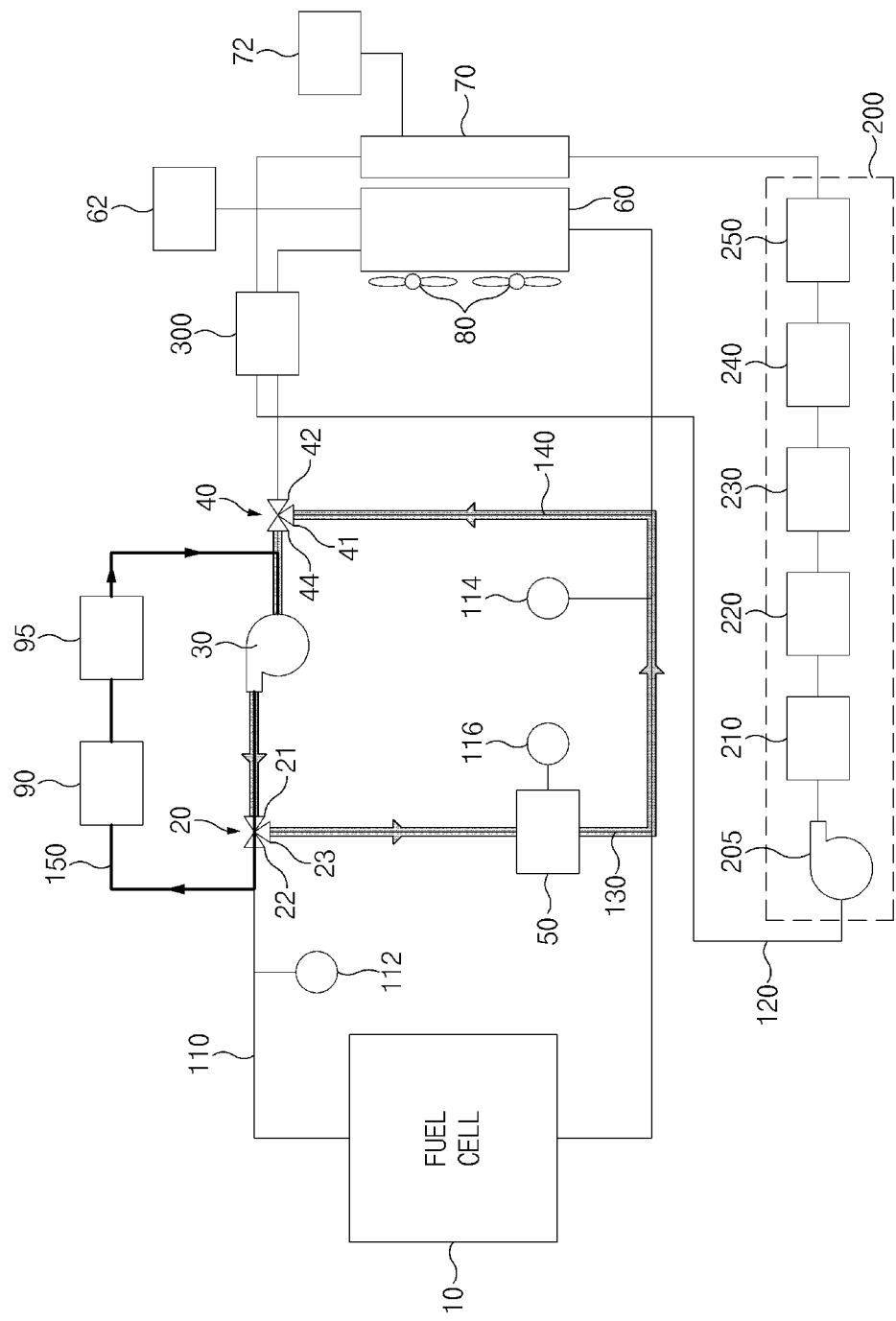
FIG. 2 illustrates the fuel cell system according to various embodiments.

FIGS. 1 and 2 illustrate a fuel cell system according to various embodiments.

Referring to FIG. 1, the fuel cell system for a vehicle may include a first cooling line 110 that passes through a fuel cell stack 10 of the vehicle and through which a first coolant circulates, a second cooling line 120 that passes through power electronic parts 200 of the vehicle and through which a second coolant circulates, and a heat exchanger 300 that allows the first coolant and the second coolant to exchange heat with each other. The first cooling line 110 and the second cooling line 120 may constitute a thermal management system (TMS) line through which the first coolant and the second coolant flow while exchanging heat with each other. In this case, the first coolant or the second coolant may be used as a cooling medium or a heating medium in the TMS line.

In addition, to form a heating loop (a heat circulation path) with the first cooling line 110 or form a cooling loop with the first cooling line 110, the fuel cell system may include a first connecting line 130, a second connecting line 150, and a third connecting line 140. The first coolant may be cooled or heated while circulating through the first connecting line 130, the second connecting line 150, or the third connecting line 140. For example, the first cooling line 110 may form a heating loop as illustrated in FIG. 2 to secure cold start ability when the vehicle is initially started and may form a cooling loop as illustrated in FIG. 1 to radiate heat generated from the fuel cell stack 10 to the outside during travel of the vehicle. In another example, when outside-air temperature is as high as a specified temperature, the first cooling line 110 may not form a heating loop, and the fuel cell system may secure start ability through heat of the fuel cell stack 10. The fuel cell stack 10, a first valve 20, a first pump 30, a second valve 40, and a first radiator 60 may be disposed on the first cooling line 110 through which the first coolant circulates.

The fuel cell stack 10 (or, referred to as the "fuel cell") may be formed in a structure capable of producing electricity through an oxidation-reduction reaction of a fuel (e.g., hydrogen) and an oxidizing agent (e.g., air). For example, the fuel cell stack 10 may include a membrane electrode assembly (MEA) in which catalyst electrode layers where an electro-chemical reaction occurs are attached to both sides of an electrolyte membrane through which hydrogen ions move, a gas diffusion layer (GDL) that uniformly distributes reactant gases and delivers generated electrical energy, a gasket and a fastening mechanism for maintaining air-tightness of the reactant gases and the first coolant and appropriate fastening pressure, and a bipolar plate that moves the reactant gases and the first coolant.

In the fuel cell stack 10, hydrogen that is a fuel and air (oxygen) that is an oxidizing agent may be supplied to an anode and a cathode of the membrane electrode assembly through fluid channels of the bipolar plate, respectively. The hydrogen may be supplied to the anode, and the air may be supplied to the cathode. The hydrogen supplied to the anode may be decomposed into a hydrogen ion (proton) and an electron by catalysts of the electrode layers formed on the both sides of the electrolyte membrane. Only the hydrogen ion may be selectively delivered to the cathode through the electrolyte membrane that is a cation exchange membrane, and the electron may be delivered to the cathode through the gas diffusion layer and the bipolar plate that are conductors. At the cathode, the hydrogen ion supplied through the electrolyte membrane and the electron delivered through the bipolar plate may react with oxygen in the air supplied to the cathode by an air supply device to produce water. Due to the movement of the hydrogen ion, an electron flow through an external conductor may be generated, and electric current may be produced by the electron flow.

The first valve 20 may switch a flow path of the first coolant in the first cooling line 110 to the first connecting line 130 on which a heater 50 is disposed or the fuel cell stack 10. For example, on the first cooling line 110, the first valve 20 may be connected with one end of the first pump 30, one end of the first connecting line 130, and one end of the fuel cell stack 10. The first valve 20 may include various valve means capable of selectively switching the flow path of the first coolant. For example, the first valve 20 may be a three-way valve. In this case, the first valve 20 may include a first port 21 connected with the first cooling line 110 to allow the first coolant pumped by the first pump 30 to flow into the first valve 20, a second port 22 connected with the first cooling line 110 to allow the first coolant passing through the first valve 20 to flow into the fuel cell stack 10, and a third port 23 connected with the one end of the first connecting line 130. As the second port 22 or the third port 23 of the first valve 20 is opened or closed, the flow path of the first coolant may be switched to the heater 50 of the first connecting line 130 or the fuel cell stack 10. That is, when the second port 22 is opened and the third port 23 is closed, the first coolant may flow into the fuel cell stack 10. In contrast, when the third port 23 is opened and the second port 22 is closed, the first coolant may flow into the heater 50 through the first connecting line 130.

To heat the first coolant, the first connecting line 30 may form a heating loop (a heat circulation path) with the first cooling line 110. For example, the first coolant flowing along the first connecting line 130 may be heated while passing through the heater 50 installed on the first connecting line 130. The one end of the first connecting line 130 may be connected to the first cooling line 110 at a first point located between an outlet of the first pump 30 and the fuel cell stack 10, and an opposite end of the first connecting line 130 may be connected to the first connecting line 110 at a second point located between an inlet of the first pump 30 and the fuel cell stack 10. Here, the inlet of the first pump 30 may be defined as an inlet through which the first coolant flows into the first pump 30. The outlet of the first pump 30 may be defined as an outlet through which the first coolant passing through the first pump 30 is released. The section between the outlet of the first pump 30 and the fuel cell stack 10 may be defined as a section through which the first coolant released from the first pump 30 flows to a coolant inlet (not illustrated) of the fuel cell stack 10. The section between the inlet of the first pump 30 and the fuel cell stack 10 may be defined as a section through which the first coolant released from a coolant outlet (not illustrated) of the fuel cell stack 10 flows to the inlet of the first pump 30.

The first pump 30 may be configured to force the first coolant to flow. The first pump 30 may include various means capable of pumping the first coolant, and no special limitation applies to the type of the first pump 30 and the number of first pumps 30 in this disclosure.

The second valve 40 may switch the flow path of the first coolant in the first cooling line 110 to the first radiator 60 or the fuel cell stack 10. For example, the second valve 40 may be provided on the first cooling line 110 so as to be located between the first pump 30 and the first radiator 60 and may be connected to one end of the third connecting line 140 and an outlet of the first radiator 60. The second valve 40 may include various valve means capable of selectively switching the flow path of the first coolant to the first radiator 60 or the fuel cell stack 10. For example, the second valve 40 may be a three-way valve. In this case, the second valve 40 may include a first port 41 connected with the third connecting line 140, a second port 42 connected with the first cooling line 110 to allow the first coolant passing through the first radiator 60 to flow into the second valve 40, and a third port 44 connected with the first cooling line 110 to allow the first coolant to flow into the first pump 30. As the first port 41 or the second port 42 of the second valve 40 is opened or closed, the flow path of the first coolant may be switched to the first radiator 60 or the fuel cell stack 10. That is, when the first port 41 is opened and the second port 42 is closed, the first coolant may flow into the fuel cell stack 10 without passing through the first radiator 60. In contrast, when the second port 42 is opened and the first port 41 is closed, the first coolant may flow into the fuel cell stack 10 after passing through the first radiator 60.

The second connecting line 150 may form a heating loop with the first cooling line 110 to heat a HAVC unit 90. For example, the second connecting line 150 may form a loop for heating a heater (not illustrated) of the HAVC unit 90. One end of the second connecting line 150 may be connected to the first cooling line 110 between the first point (the point at which the one end of the first connecting line 130 is connected to the first cooling line 110) and the inlet of the fuel cell stack 10, and part of the first coolant may circulate through the second connecting line 150. An opposite end of the second connecting line 150 may be connected to the first cooling line 110 between the first pump 30 and the second point (the point at which the opposite end of the first connecting line 130 is connected to the first cooling line 110).

An ion filter 95 that filters ions of the first coolant passing through the HAVC unit 90 may be disposed on the second connecting line 150. When the electric conductivity of the first coolant is increased due to corrosion or exudation of the system, electricity may flow into the first coolant, and therefore the fuel cell stack 10 may short-circuit or electric current may flow toward the first coolant. Accordingly, the first coolant has to be able to maintain a low electric conductivity. To maintain the electric conductivity of the first coolant below a predetermined level, the ion filter 95 may be configured to remove ions contained in the first coolant. During a cold-start operation in which the supply of the first coolant to the fuel cell stack 10 is stopped (or, the second port 22 of the first valve 20 is closed), the first coolant may circulate while passing through the heater 50 of the first connecting line 130 (a heating loop) and may circulate along the second connecting line 150. Accordingly, even during the cold-start operation, filtering (removal of ions contained in the first coolant) is able to be performed by the ion filter 95 disposed on the second connecting line 150. As a result, the electric conductivity of the first coolant flowing into the fuel cell stack 10 immediately after the cold-start operation may be maintained below the predetermined level.

To cool the first coolant, the third connecting line 140 may form a cooling loop with the first cooling line 110. For example, the one end of the third connecting line 140 may be connected to the first cooling line 110 between the first pump 30 and the first radiator 160, and an opposite end of the third connecting line 140 may be connected to the first cooling line 110 between the coolant outlet of the fuel cell stack 10 and the first radiator 60.

The first radiator 60 may be configured to cool the first coolant. The first radiator 60 may be formed in various structures capable of cooling the first coolant, and the present disclosure is not limited by the type and structure of the first radiator 60. The first radiator 60 may be connected to a first reservoir 62 in which the first coolant is stored.

The fuel cell system may include a first temperature sensor 112 that measures the temperature of the first coolant between the fuel cell stack 10 and the first point (the first valve 20), a second temperature sensor 114 that measures the temperature of the first coolant between the opposite end of the first connecting line 130 and the first pump 30, and a third temperature sensor 116 that measures the temperature of the first coolant in the heater 50. The fuel cell system may control the inflow rate of the first coolant flowing into the fuel cell stack 10, based on the temperatures measured by the first temperature sensor 112, the second temperature sensor 114, and the third temperature sensor 116. For example, when the measured temperature of the first coolant circulating along the first cooling line 110 is lower than a preset target temperature, the inflow rate of the first coolant may be controlled to be lower than a preset flow rate. By controlling the inflow rate of the first coolant flowing into the fuel cell stack 10 to be lower than the preset flow rate when the measured temperature of the first coolant is lower than the preset target temperature, thermal shock and performance degradation caused by a difference between the temperature of the first coolant stagnating in the fuel cell stack 10 and the temperature of the first coolant flowing into the fuel cell stack 10 may be minimized.

The second cooling line 120 may be configured to pass through the power electronic parts 200 of the vehicle, and the second coolant may circulate along the second cooling line 120. Here, the power electronic parts 200 of the vehicle may be understood as parts that use electric power of the vehicle as an energy source, and the present disclosure is not limited by the types and number of power electronic parts 200 of the vehicle. For example, the power electronic parts 200 may include at least one of a second pump 205 for pumping the second coolant, a bi-directional high voltage DC-DC converter (BHDC) 210 provided between the fuel cell stack 10 and a high-voltage battery (not illustrated) of the vehicle, a blower pump control unit (BPCU) 220 that controls a blower (not illustrated) that supplies outside air for driving the fuel cell stack 10, a low-voltage DC-DC converter (LDC) 230 that converts DC high-voltage supplied from the high-voltage battery into DC low-voltage, an air compressor (ACP) 240 that compresses air to be supplied into the fuel cell stack 10, or an air cooler 250.

The second pump 205 for forcing the second coolant to flow may be disposed on the second cooling line 120. The second pump 205 may include a pumping means capable of pumping the second coolant, and no special limitation applies to the type and characteristics of the second pump 205.

A second radiator 70 for cooling the second coolant may be disposed on the second cooling line 120. The second radiator 70 may be formed in various structures capable of cooling the second coolant, and no special limitation applies to the type and structure of the second radiator 70. The second radiator 70 may be connected to a second reservoir 72 in which the second coolant is stored.

In an embodiment, the first radiator 60 and the second radiator 70 may be configured to be simultaneously cooled by one cooling fan 80. For example, the first radiator 60 and the second radiator 70 may be disposed side by side, and the cooling fan 80 may be configured to blow outside air toward the first radiator 60 and the second radiator 70. By simultaneously cooling the first radiator 60 and the second radiator 70 with the one cooling fan 80, the structure of the fuel cell system may be simplified, a degree of freedom in design and space utilization may be improved, and power consumption for cooling the first radiator 60 and the second radiator 70 may be minimized.

The heat exchanger 300 may be configured to allow the first coolant and the second coolant to exchange heat with each other. The temperature of the second coolant for cooling the power electronic parts 200 is set to be lower than the temperature of the first coolant for cooling the fuel cell stack 10. Accordingly, by allowing the first coolant and the second coolant to exchange heat with each other, the fuel cell system may achieve a decrease in the temperature of the first coolant, an improvement in the cooling efficiency of the fuel cell stack 10, and an improvement in safety and reliability even without increasing the capacities of the first radiator 60 and the cooling fan 80. Furthermore, the fuel cell system may lower the temperature of the first coolant in a stop state of a vehicle (e.g., a construction machine) that cannot use vehicle-induced wind. Accordingly, the fuel cell system may ensure high-power operation of the fuel cell stack 10 and may improve safety and durability.

In an embodiment, the heat exchanger 300 may be connected to the first cooling line 110 between the outlet of the first radiator 60 and the fuel cell stack 10, and the second cooling line 120 may pass through the heat exchanger 300 and may connect an outlet of the second radiator 70 and the power electronic parts 200. For example, the first coolant may flow along the heat exchanger 300 connected to the first cooling line 110, and the second cooling line 120 may pass through the inside of the heat exchanger 300 so as to be exposed to the first coolant (e.g., so as to allow the first coolant to flow around the second cooling line 120). As described above, the fuel cell system may lower the temperature of the first coolant flowing into the fuel cell stack 10 by the heat exchange between the first coolant and the second coolant. A first temperature of the first coolant passing through the first radiator 60 may be higher than a second temperature of the second coolant passing through the second radiator 70, and a third temperature of the first coolant passing through the heat exchanger 300 may be lower than the first temperature. For example, the first temperature of the first coolant may be higher than the second temperature of the second coolant by about 10° C., and the third temperature of the first coolant that passes through the heat exchanger 300 (or, exchanges heat with the second coolant) may be lower than the first temperature by 1° C.

To lower the temperature of the first coolant flowing into the fuel cell stack 10, the fuel cell system may increase the RPM of the cooling fan 80, or may increase the RPM of the first pump 30. Furthermore, the fuel cell system may increase the flow rate of the second coolant by increasing the RPM of the second pump 205. In this case, the amount of heat exchanged in the heat exchanger 300 may be increased, and a cooling capacity for the first coolant may be increased by the increase in the amount of heat exchanged. With the increase in the RPM of the cooling fan 80 or the pump 30 or 205, not only the cooling capacity but also power consumption of the cooling fan 80 or the pump 30 or 205 may be increased. The fuel cell system according to the embodiments may optimize the RPMs of the cooling fan 80 and the pump 30 or 205 to efficiently manage power consumption while maintaining the temperature of the first coolant at the inlet of the fuel cell stack 10 at a target temperature.

Figure 3:
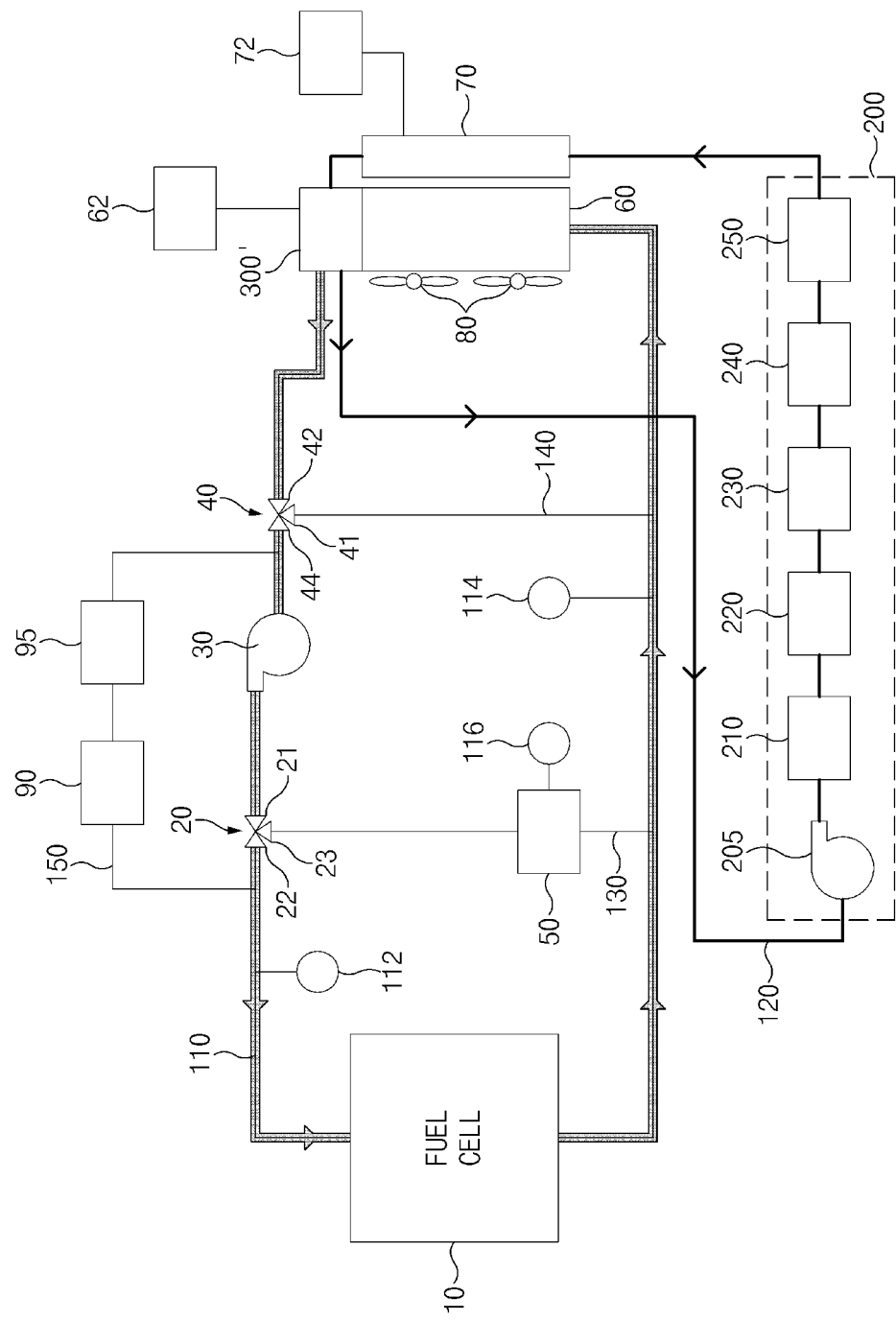
FIG. 3 illustrates another example of the fuel cell system according to various embodiments.
Figure 4:
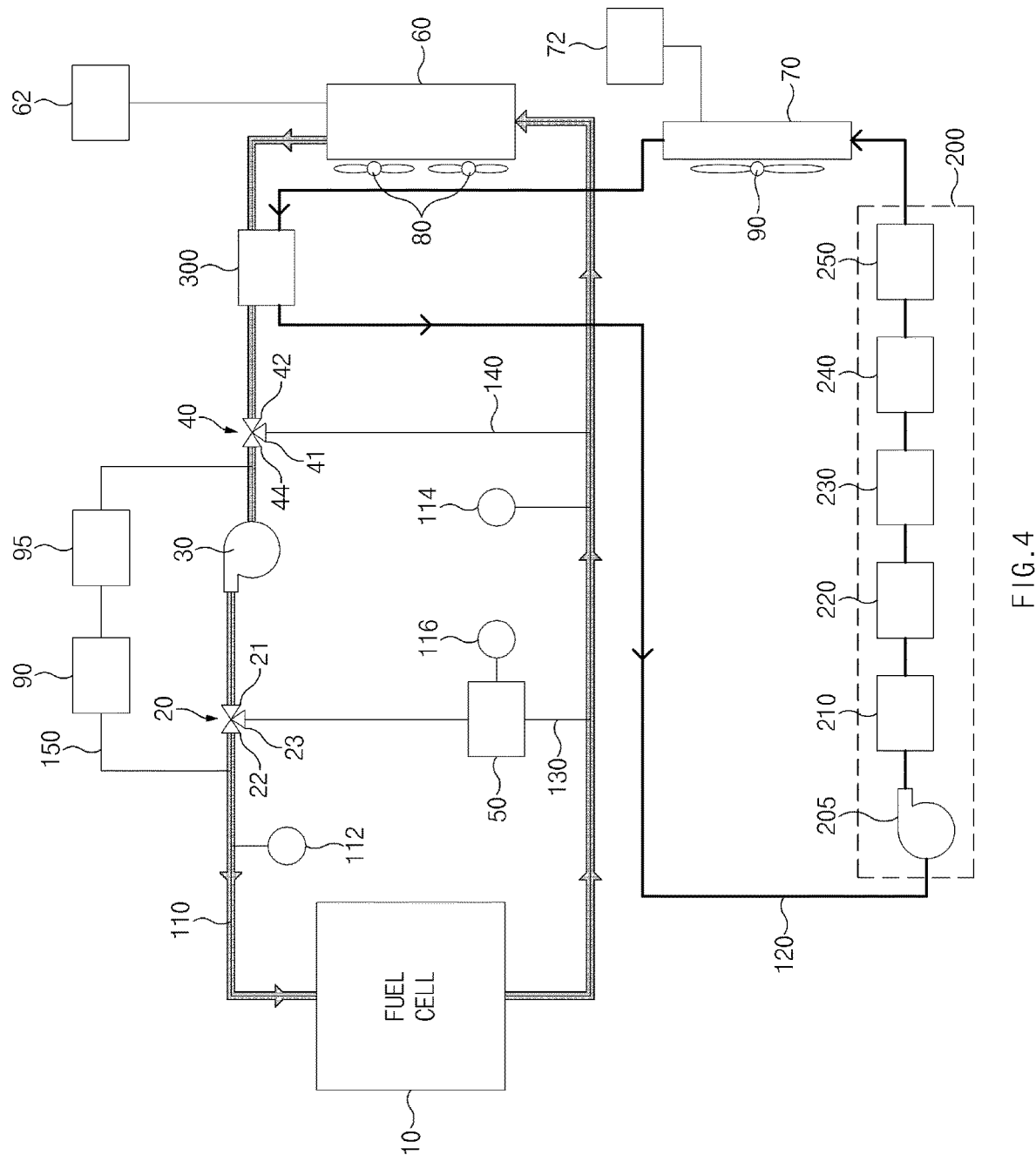
FIG. 4 illustrates another example of the fuel cell system according to various embodiments.

FIGS. 3 and 4 illustrate other examples of the fuel cell system according to various embodiments.

The heat exchanger 300 in FIGS. 1 and 2 is disposed separately from the first radiator 60, whereas a heat exchanger 300' in FIG. 3 may be directly connected to the first radiator 60. The heat exchanger 300' may be formed in various structures capable of being connected with the first radiator 60, and no special limitation applies to the structure and the connecting structure of the heat exchanger 300'. For example, the heat exchanger 300' may be connected to a specified location (an upper left portion) of the first radiator 60. However, the specified location of the first radiator 60 to which the heat exchanger 300' is connected may be changed.

Referring to FIG. 4, the first fan 80 for cooling the first radiator 60 and a second cooling fan 90 for cooling the second radiator 70 may be separately disposed. In this case, the fuel cell system may exclude parameters related to heat loads of the power electronic parts 200 when controlling the RPM of the first cooling fan 80.

The principle of optimization mentioned with regard to FIGS. 1 and 2 may be similarly applied to the fuel cell systems of FIGS. 3 and 4. In this case, the RPM of the pump 30 or 205 and the RPM of the first cooling fan 80 or the second cooling fan 90 may be optimized.

Figure 5:
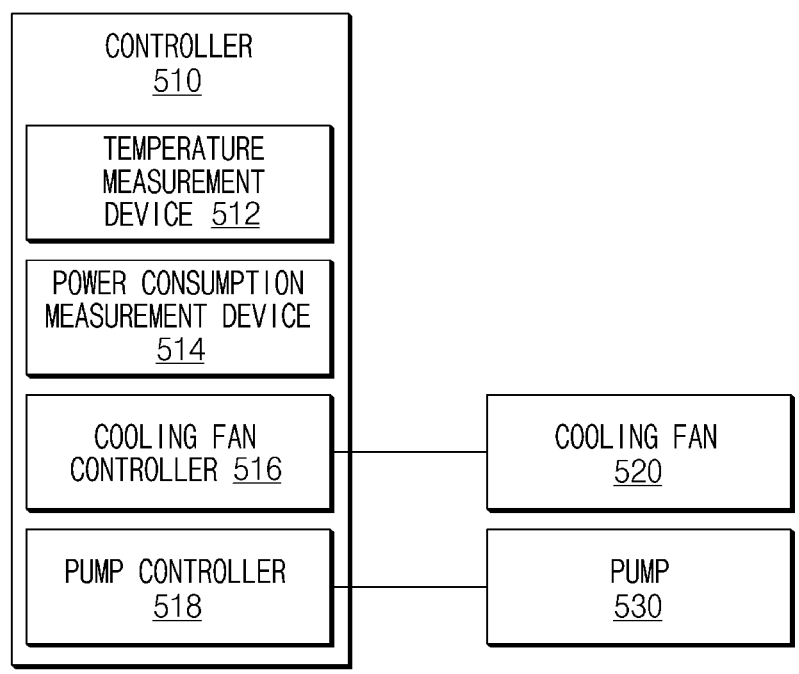
FIG. 5 is a block diagram of a fuel cell system controlling a cooling fan according to various embodiments.

FIG. 5 is a block diagram of a fuel cell system controlling a cooling fan according to various embodiments. Referring to FIG. 5, the fuel cell system may include a controller 510, a cooling fan 520, and a pump 530. The cooling fan 520 may correspond to the cooling fan 80 or 90 illustrated in FIGS. 1 to 4. The pump 530 may correspond to the first pump 30 or the second pump 205 illustrated in FIGS. 1 to 4.

The controller 510 may be a hardware or software module for optimizing the cooling fan 520 and the pump 530. The controller 510 may be electrically connected with the cooling fan 520 and the pump 530 and may perform an overall operation of the fuel cell system that controls the RPMs of the cooling fan 520 and the pump 530. For example, the controller 510 may retrieve(call) a preset RPM of the cooling fan 520 and a preset RPM of the pump 530 and may optimize the RPM of the cooling fan 520 and the RPM of the pump 530 through a decrease in the RPM of the cooling fan 520 and an increase in the RPM of the pump 530 such that the temperature of a coolant (that is, the first coolant) at the inlet of the fuel cell stack 10 satisfies a specified condition and total power consumption is minimized. The total power consumption may refer to the sum of power consumption of the cooling fan 520 at a specific RPM and power consumption of the pump 530 at a specific RPM. The controller 510 may store the optimized RPM of the cooling fan 520 and the optimized RPM of the pump 530.

The controller 510 may include a temperature measurement device 512 (e.g., the first temperature sensor 112 of FIG. 1) configured to measure the coolant temperature at the inlet of the fuel cell stack 10, a power consumption measurement device 514 configured to measure the power consumptions of the cooling fan 520 and the pump 530, a cooling fan controller 516 configured to control the RPM of the cooling fan 520, and a pump controller 518 configured to control the RPM of the pump 530. According to embodiments, the temperature measurement device 512, the power consumption measurement device 514, the cooling fan controller 516, and the pump controller 518 may be integrated into a single module, or may be implemented with separate modules.

Figure 6:
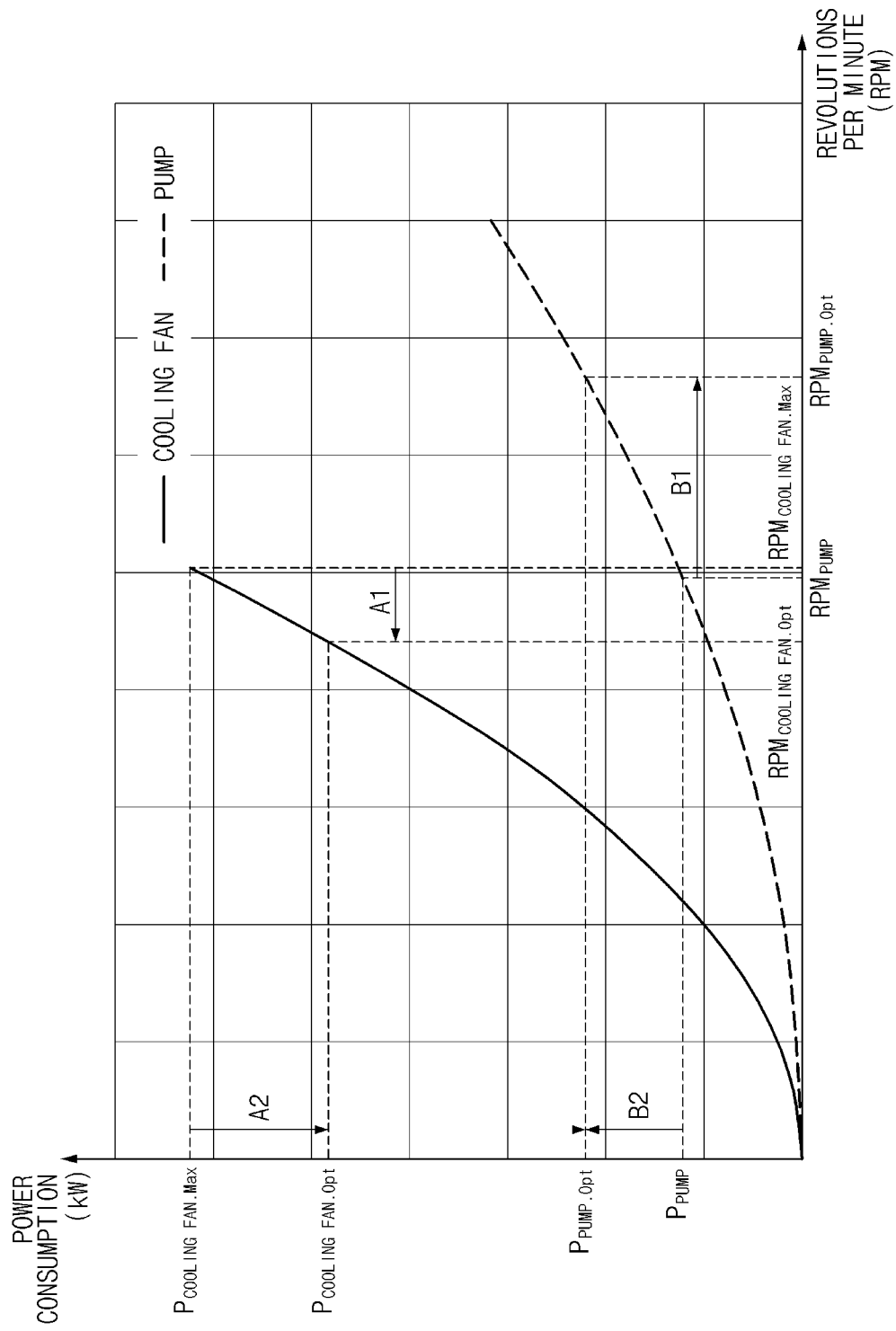
FIG. 6 is a graph depicting a relationship between RPM and power consumption.

FIG. 6 is a graph depicting a relationship between RPM and power consumption.

Referring to FIG. 6, the horizontal axis of the graph may represent revolutions per minute (unit: RPM) of the cooling fan 520 or the pump 530, and the vertical axis of the graph may represent power consumption of the cooling fan 520 or the pump 530. An increase in power consumption depending on an increase in RPM may have the form of a quadratic function, and therefore, power consumption may rapidly increase as the RPM of the cooling fan 520 or the pump 530 approaches a maximum RPM. Furthermore, the cooling fan 520 may be large in power consumption against RPM, compared to the pump 530. Therefore, although the RPM of the pump 530 decreases, total power consumption may increase due to an increase in the RPM of the cooling fan 520.

The fuel cell system may reduce power consumption without cooling performance degradation by increasing the RPM of the pump 530 while decreasing the RPM of the cooling fan 520. For example, when the RPM of the cooling fan 520 decreases from maximum revolutions per minute $RPM_{CoolingFan.Max}$ to optimum revolutions per minute $RPM_{Cooling Fan.Opt}$ (A1), power consumption of the cooling fan 520 may decrease from maximum power consumption $P_{Cooling Fan.Max}$ to optimum power consumption $P_{Cooling Fan.Opt}$ (A2), and when the RPM of the pump 530 increases from preset revolutions per minute $RPM_{Pump}$ to optimum revolutions per minute $RPM_{Pump.Opt}$ (B1), power consumption of the pump 530 may increase from existing power consumption $P_{Pump}$ to optimum power consumption $P_{Pump.Opt}$ (B2). In this case, the decreased power consumption A2 of the cooling fan 520 may be greater than the increased power consumption B2 of the pump 530, and thus total power consumption may decrease.

Figure 7:
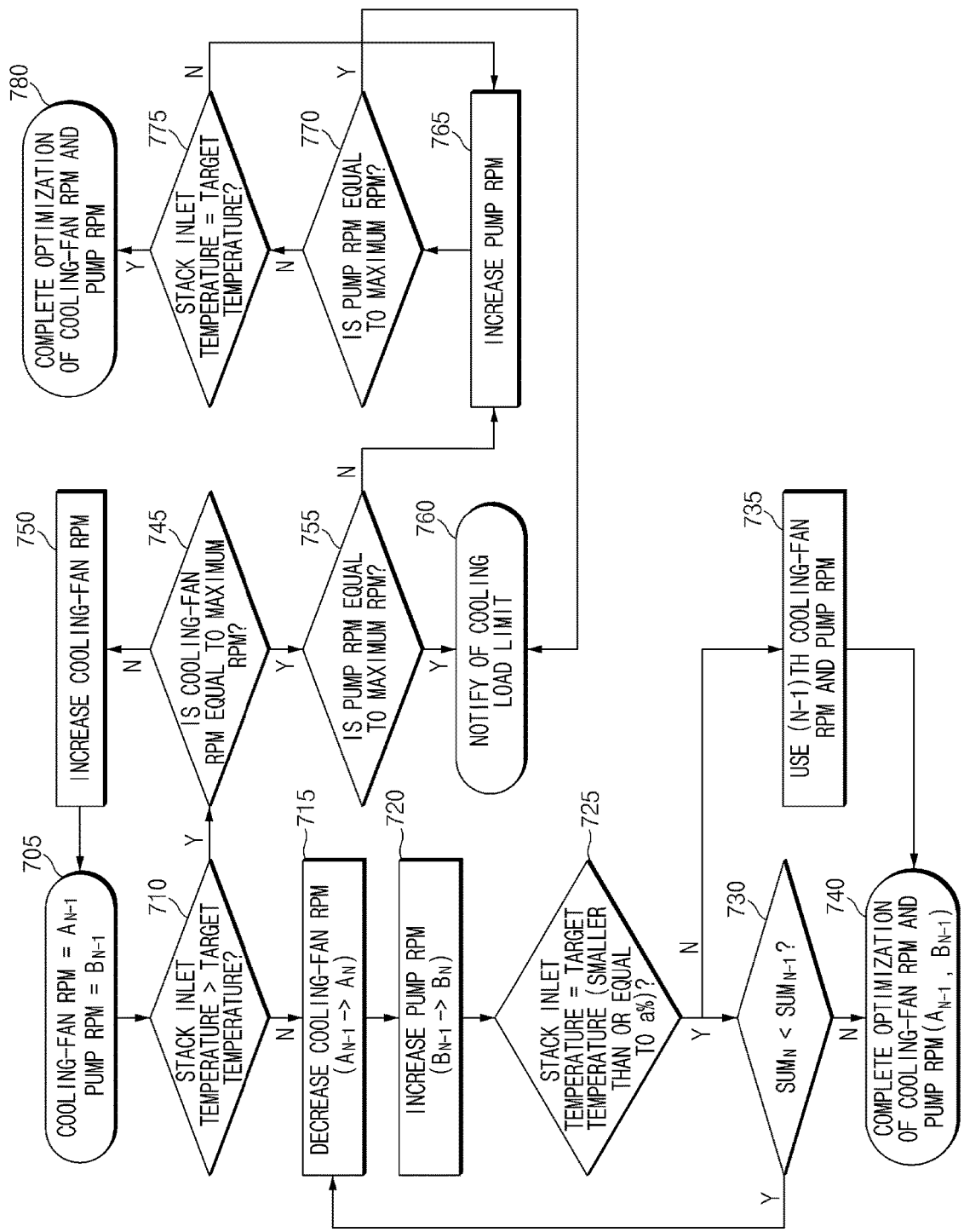
FIG. 7 is an operation flowchart for optimizing a cooling-fan RPM and a pump RPM according to various embodiments.

FIG. 7 is an operation flowchart for optimizing a cooling-fan RPM and a pump RPM according to various embodiments. Operations included in operation flowcharts of FIGS. 7 to 11 may be implemented by the fuel cell system, or may be implemented by the components of the fuel cell system.

Referring to FIG. 7, in operation 705, the fuel cell system may retrieve (call) a preset cooling-fan RPM $A_{N-1}$ of the cooling fan 520 and a preset pump RPM $B_{N-1}$ of the pump 530. Here, N may refer to a natural number. In an embodiment, the fuel cell system may calculate total power consumption $SUM_{N-1}$ of the cooling fan 520 and the pump 530. For example, the controller 510 may measure power consumptions corresponding to the cooling-fan RPM and the pump RPM retrieved through the power consumption measurement device 514 and may calculate the sum of the measured power consumptions.

In operation 710, the fuel cell system may determine whether a coolant temperature (or, referred to as a "stack inlet temperature") at the inlet of the fuel cell stack 10 at the retrieved cooling-fan RPM and the retrieved pump RPM exceeds a target temperature. The target temperature may refer to, for example, an optimum temperature value (or range) for efficiently operating the fuel cell stack 10. When the stack inlet temperature is lower than or equal to the target temperature, the fuel cell system may perform operations 715 to 740 to raise power consumption efficiency. When the stack inlet temperature exceeds the target temperature, the fuel cell system may perform operations 745 to 780 to ensure cooling performance.

In operation 715, the fuel cell system may decrease the cooling-fan RPM (e.g., $A_{N-1} \rightarrow A_N$). In an embodiment, the fuel cell system may measure power consumption of the cooling fan 520, the RPM of which is decreased.

In operation 720, the fuel cell system may increase the pump RPM (e.g., $B_{N-1} \rightarrow B_N$). In an embodiment, the fuel cell system may measure power consumption of the pump 530, the RPM of which is increased. In an embodiment, the fuel cell system may calculate the sum $SUM_N$ of the power consumption of the cooling fan 520, the RPM of which is decreased, and the power consumption of the pump 530, the RPM of which is increased.

In operation 725, the fuel cell system may determine whether a difference between the stack inlet temperature corresponding to the changed cooling-fan RPM and the changed pump RPM and the target temperature is smaller than or equal to a specified threshold value (e.g., smaller than or equal to a % of the target temperature). When the difference between the stack inlet temperature and the target temperature exceeds the specified threshold value, cooling efficiency of the fuel cell system may be deteriorated. Therefore, in operation 735, the fuel cell system may use the previous cooling-fan RPM $A_{N-1}$ and the previous pump RPM $B_{N-1}$, and in operation 740, the fuel cell system may complete optimization.

When the difference between the stack inlet temperature and the target temperature is smaller than or equal to the specified threshold value, the fuel cell system may, in operation 730, determine whether the total power consumption $SUM_N$ at the changed RPMs is less than the total power consumption $SUM_{N-1}$ at the previous RPMs. When the total power consumption $SUM_N$ at the changed RPMs is less than the total power consumption $SUM_{N-1}$ at the previous RPMs, the fuel cell system may repeat operations 715 to 730 to additionally identify a cooling-fan RPM and a pump RPM at which the stack inlet temperature remains at the target temperature and power consumption is decreased. When the total power consumption $SUM_N$ at the changed RPMs is greater than or equal to the total power consumption $SUM_{N-1}$ at the previous RPMs, the fuel cell system may determine the previous RPMs $A_{N-1}$ and $B_{N-1}$ of the cooling fan 520 and the pump 530 to be optimized values and may complete optimization by storing the determined values.

In operation 745, the fuel cell system may determine whether the retrieved cooling-fan RPM $A_{N-1}$ is equal to a specified maximum RPM. When the cooling-fan RPM is not equal to the specified maximum RPM, the fuel cell system may, in operation 750, increase the cooling-fan RPM and may perform operations 705 and 710 again.

When the cooling-fan RPM is equal to the specified maximum RPM, the fuel cell system may, in operation 755, determine whether the retrieved pump RPM $B_{N-1}$ is equal to a specified maximum RPM. When the pump RPM is equal to the specified maximum RPM, the fuel cell system can no longer cool the fuel cell stack 10 through the control of the cooling-fan RPM and the pump RPM. Therefore, the fuel cell system may, in operation 760, output a cooling load limit notification.

When the pump RPM is not equal to the specified maximum RPM, the fuel cell system may lower the stack inlet temperature to the target temperature by increasing the pump RPM. For example, in operation 765, the fuel cell system may increase the pump RPM. In operation 770, the fuel cell system may determine whether the increased pump RPM is equal to the specified maximum RPM. When the increased pump RPM is equal to the specified maximum RPM, the fuel cell system may, in operation 760, output a cooling load limit notification. When the increased pump RPM is not equal to the specified maximum RPM, the fuel cell system may, in operation 775, determine whether the stack inlet temperature corresponding to the increased pump RPM is equal to the target temperature. When the stack inlet temperature exceeds the target temperature, the fuel cell system may repeat operations 765 to 775. When the stack inlet temperature is lower than or equal to the target temperature, the fuel cell system may use the increased pump RPM and may, in operation 780, complete optimization of the cooling-fan RPM and the pump RPM.

According to an embodiment, the controller 510 may adjust the RPM of the pump 530, based on table information representing an increment in pump RPM required depending on a difference between the coolant temperature at the inlet of the fuel cell stack 10 and the target temperature. For example, the table information may be represented as in Table 1 below.

TABLE 1

| | Coolant Temperature at Inlet of Fuel Cell Stack—Target Temperature | | | | | |
|---|---|---|---|---|---|---|
| | ≤0 | ≤A | ≤B | ≤C | ≤D | ≤E |
| Pump RPM (Unit: RPM) | T | T + a | T + b | T + c | T + d | T + e |

The table information in Table 1 may be based on the relations A<B<C<D<E and a<b<c<d<e.

Figure 8:
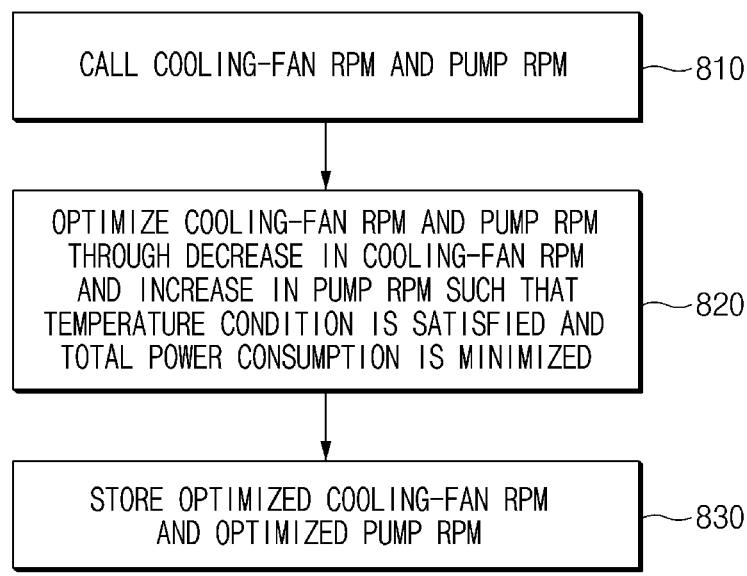
FIG. 8 is an operation flowchart for optimizing a cooling-fan RPM and a pump RPM according to various embodiments.

FIG. 8 is an operation flowchart for optimizing a cooling-fan RPM and a pump RPM according to various embodiments.

Referring to FIG. 8, in operation 810, the fuel cell system may retrieve (call) a preset cooling-fan RPM and a preset pump RPM. According to an embodiment, the cooling fan 520 having the preset cooling-fan RPM may be configured to cool at least one of the first radiator 60 or the second radiator 70. The pump 530 having the preset pump RPM may be configured to pump the second coolant passing through the power electronic parts 200 of the vehicle. In a case where the temperature of the second coolant is lower than the temperature of the first coolant passing through the fuel cell stack 10, the flow rate of the second coolant may increase as the RPM of the pump 530 increases, and the temperature of the first coolant may be lowered by heat exchange, which may lead to a drop in the temperature of the fuel cell stack 10. In another embodiment, the pump 530 having the preset pump RPM may be configured to pump the first coolant passing through the fuel cell stack 10.

In operation 820, the fuel cell system may perform optimization through a decrease in the cooling-fan RPM and an increase in the pump RPM such that a coolant temperature at the inlet of the fuel cell stack 10 satisfies a temperature condition and total power consumption is minimized.

In operation 830, the fuel cell system may store the optimized cooling-fan RPM and the optimized pump RPM.

Figure 9:
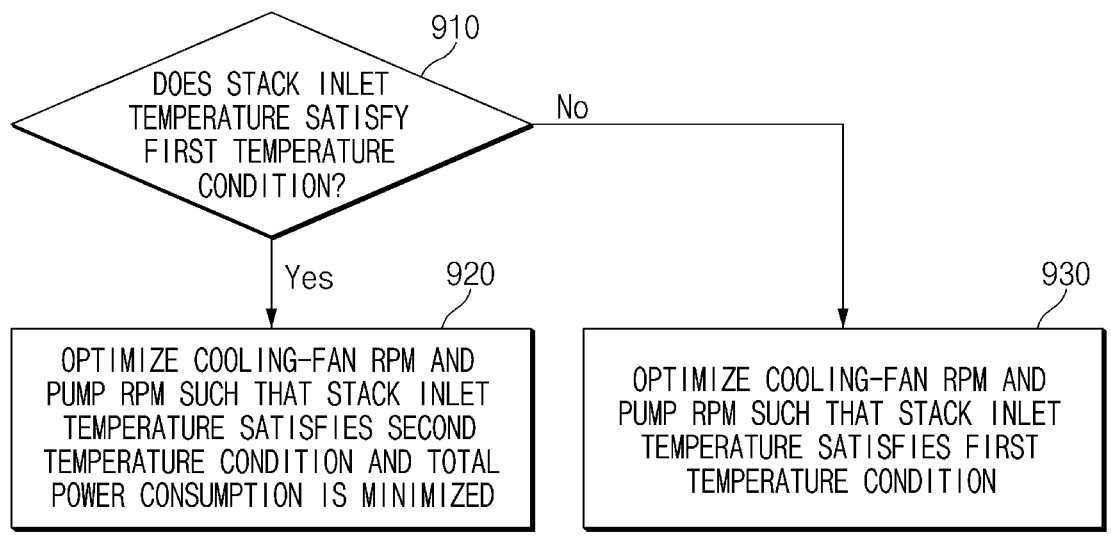
FIG. 9 is an operation flowchart for optimizing a cooling-fan RPM and a pump RPM according to various embodiments.

FIG. 9 is an operation flowchart for optimizing a cooling-fan RPM and a pump RPM according to various embodiments. For example, operations illustrated in FIG. 9 may be one embodiment of operation 820 of FIG. 8.

Referring to FIG. 9, in operation 910, the fuel cell system may determine whether a stack inlet temperature at the current cooling-fan RPM and the current pump RPM satisfies a first temperature condition. For example, when the stack inlet temperature is lower than a target temperature, the fuel cell system may determine that the stack inlet temperature satisfies the first temperature condition. The target temperature may refer to an optimum temperature value (or range) for efficiently operating the fuel cell stack 10.

When the stack inlet temperature satisfies the first temperature condition, the fuel cell system may, in operation 920, optimize the cooling-fan RPM and the pump RPM such that the stack inlet temperature satisfies a second temperature condition and the total power consumption is minimized. For example, when the stack inlet temperature corresponding to the adjusted cooling-fan RPM and the adjusted pump RPM is lower than the target temperature and a difference between the stack inlet temperature and the target temperature is smaller than a threshold value, the fuel cell system may determine that the stack inlet temperature satisfies the second temperature condition. The total power consumption may be the sum of power consumption of the cooling fan 520 that corresponds to the adjusted cooling-fan RPM and power consumption of the pump 530 that corresponds to the adjusted pump RPM.

When the stack inlet temperature does not satisfy the first temperature condition, the fuel cell system may, in operation 930, optimize the cooling-fan RPM and the pump RPM such that the stack inlet temperature satisfies the first temperature condition.

Figure 10:
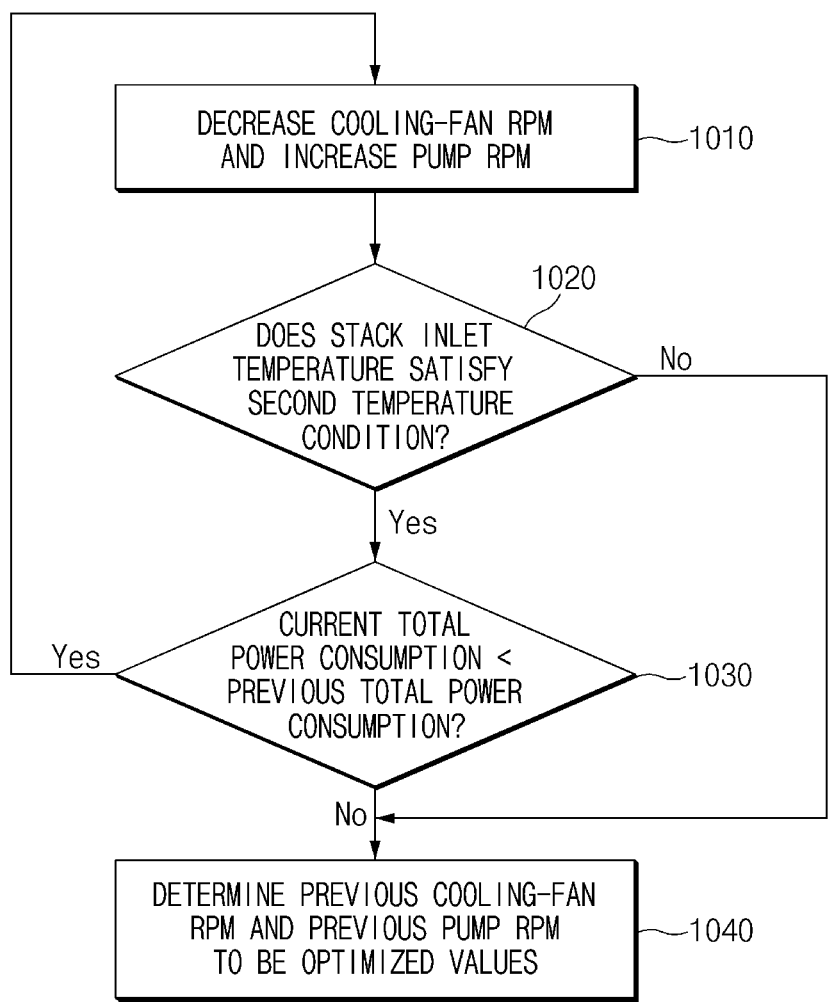
FIG. 10 is an operation flowchart for optimizing a cooling-fan RPM and a pump RPM according to various embodiments.

FIG. 10 is an operation flowchart for optimizing a cooling-fan RPM and a pump RPM according to various embodiments. Operations illustrated in FIG. 10 may be one embodiment of operation 920 of FIG. 9.

Referring to FIG. 10, in operation 1010, the fuel cell system may decrease the retrieved cooling-fan RPM and may increase the retrieved pump RPM. In operation 1020, the fuel cell system may determine whether the stack inlet temperature corresponding to the current cooling-fan RPM and the current pump RPM satisfies the second temperature condition. When the stack inlet temperature does not satisfy the second temperature condition, the fuel cell system may, in operation 1040, determine the previous cooling-fan RPM and the previous pump RPM to be optimized values.

When the stack inlet temperature satisfies the second temperature condition, the fuel cell system may, in operation 1030, determine whether the current total power consumption is less than the previous total power consumption. When the current total power consumption is less than the previous total power consumption, the fuel cell system may repeat operations 1010 to 1030. When the current total power consumption is greater than or equal to the previous total power consumption, the fuel cell system may, in operation 1040, determine the previous cooling-fan RPM and the previous pump RPM to be optimized values. Through the above-described operations, the fuel cell system may determine a cooling-fan RPM and a pump RPM that minimize power consumption while satisfying a temperature condition.

Figure 11:
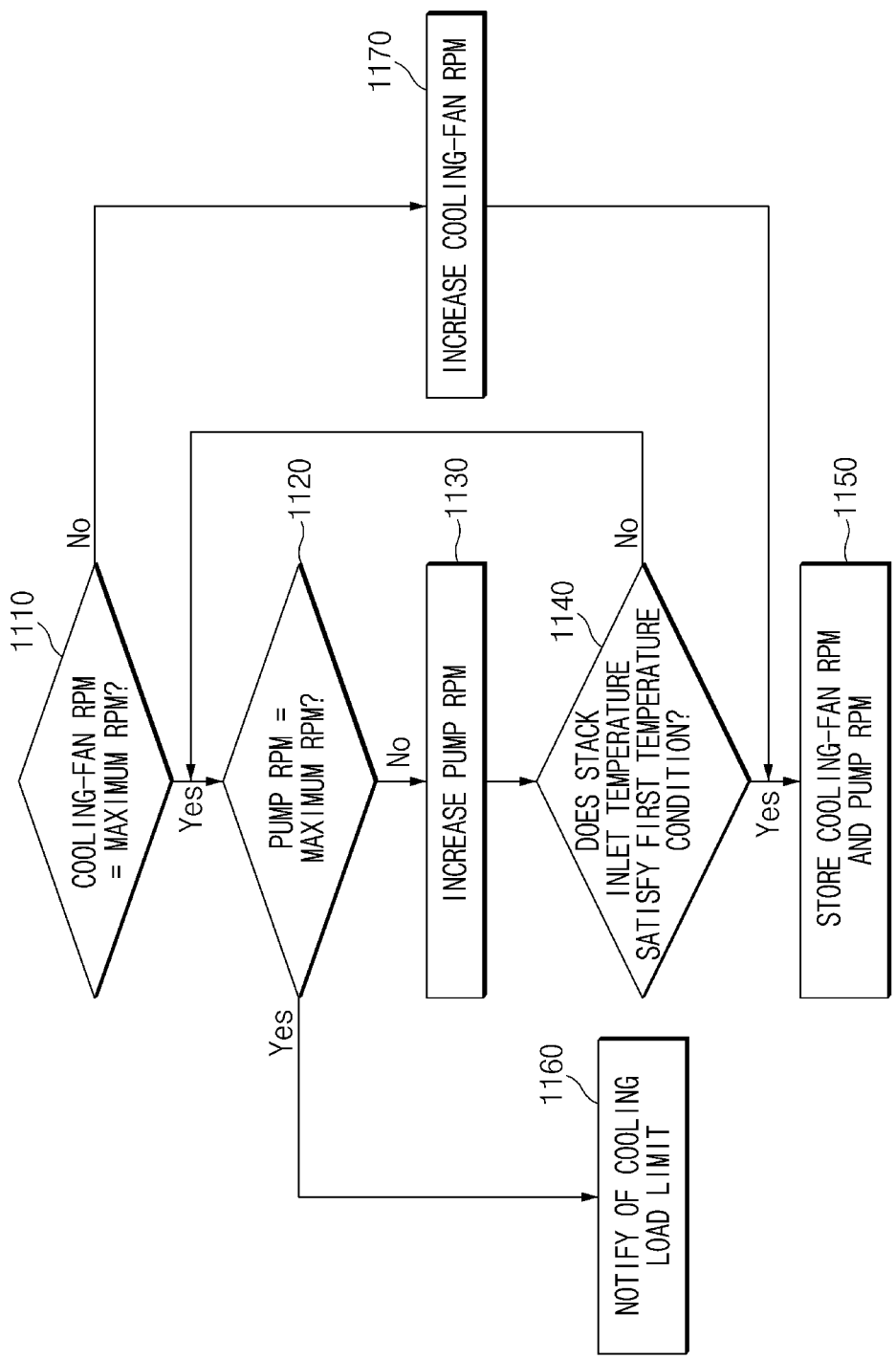
FIG. 11 is an operation flowchart for optimizing a cooling-fan RPM and a pump RPM according to various embodiments.

FIG. 11 is an operation flowchart for optimizing a cooling-fan RPM and a pump RPM according to various embodiments. Operations illustrated in FIG. 11 may be one embodiment of operation 930 of FIG. 9.

Referring to FIG. 11, in operation 1110, the fuel cell system may determine whether the retrieved cooling-fan RPM is equal to a specified maximum RPM. When the retrieved cooling-fan RPM is not equal to the specified maximum RPM, the fuel cell system may, in operation 1170, increase the cooling-fan RPM and may, in operation 1150, store the increased cooling-fan RPM and the retrieved pump RPM. Thereafter, the fuel cell system may perform operation 820 of FIG. 8 again.

When the retrieved cooling-fan RPM is equal to the specified maximum RPM, the fuel cell system may, in operation 1120, determine whether the retrieved pump RPM is equal to a specified maximum RPM. When the retrieved pump RPM is equal to the specified maximum RPM, the fuel cell system cannot lower the stack inlet temperature through the control of the RPMs of the cooling fan 520 and the pump 530. Therefore, in operation 1160, the fuel cell system may output a cooling load limit notification.

When the retrieved pump RPM is not equal to the specified maximum RPM, the fuel cell system may, in operation 1030, increase the pump RPM. In addition, the fuel cell system may, in operation 1040, determine whether the stack inlet temperature corresponding to the increased pump RPM satisfies the first temperature condition. When the stack inlet temperature does not satisfy the first temperature condition, the fuel cell system may repeatedly perform operations 1120 to 1140.

When the stack inlet temperature satisfies the first temperature condition, the fuel cell system may, in operation 1150, store the retrieved cooling-fan RPM and the changed pump RPM.

According to the embodiments of the present disclosure, the fuel cell system may improve efficiency of the thermal management system while ensuring cooling performance.

Furthermore, according to the embodiments of the present disclosure, the fuel cell system may allow for efficient heat exchange between the coolant for the fuel cell stack and the coolant for the power electronic parts.

In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell system comprising:
a cooling fan configured to cool a coolant;
a pump configured to pump the coolant; and
a controller communicatively connected with the cooling fan and the pump,
wherein the controller is configured to:
retrieve a preset cooling-fan RPM and a preset pump RPM,
optimize the cooling-fan RPM and the pump RPM through a decrease of the cooling-fan RPM and an increase of the pump RPM such that a coolant temperature at an inlet of a fuel cell stack satisfies a specified temperature condition and a total power consumption is minimized, wherein the total power consumption is a sum of a power consumption corresponding to the cooling-fan RPM and a power consumption corresponding to the pump RPM, and
store the optimized cooling-fan RPM and the optimized pump RPM,
wherein the controller is further configured to:
determine whether the coolant temperature at the retrieved cooling-fan RPM and the retrieved pump RPM exceeds a target temperature,
optimize the cooling-fan RPM and the pump RPM to lower the coolant temperature to the target temperature or less when the coolant temperature exceeds the target temperature, and
optimize the cooling-fan RPM and the pump RPM such that a difference between the coolant temperature and the target temperature is smaller than or equal to a threshold value and the total power consumption is minimized when the coolant temperature is lower than or equal to the target temperature,
wherein the controller is further configured to:
decrease the cooling-fan RPM and increase the pump RPM when the coolant temperature is lower than or equal to the target temperature,
compare a first total power consumption corresponding to the decreased cooling-fan RPM and the increased pump RPM with a second total power consumption corresponding to the retrieved cooling-fan RPM and the retrieved pump RPM,
decrease the cooling-fan RPM and increase the pump RPM when the first total power consumption is less than the second total power consumption, and
determine the retrieved cooling-fan RPM and the retrieved pump RPM to be optimized values when the first total power consumption is greater than or equal to the second total power consumption.

2. The fuel cell system of claim 1, wherein the controller includes:
a cooling fan controller configured to control an RPM of the cooling fan; and
a pump controller configured to control an RPM of the pump.

3. The fuel cell system of claim 2, wherein the cooling fan controller and the pump controller are integrated into a single module.

4. The fuel cell system of claim 1, wherein the controller is further configured to:
determine whether the cooling-fan RPM is equal to a specified maximum RPM when the coolant temperature exceeds the target temperature, and
optimize the pump RPM through an increase of the pump RPM such that the coolant temperature satisfies the target temperature when the cooling-fan RPM is equal to the specified maximum RPM.

5. The fuel cell system of claim 4, wherein the controller is further configured to output a cooling load limit notification when the cooling-fan RPM and the pump RPM are maximal.

6. The fuel cell system of claim 1, further comprising:
a first cooling line through which a first coolant circulates, the first cooling line being configured to pass through the fuel cell stack;
a first radiator disposed on the first cooling line and configured to cool the first coolant;
a second cooling line through which a second coolant circulates, the second cooling line being configured to pass through a power electronic part;
a second radiator disposed on the second cooling line and configured to cool the second coolant; and
a heat exchanger configured to allow the first coolant and the second coolant to exchange heat with each other,
wherein the pump is disposed on the second cooling line, and
wherein the cooling fan is configured to cool at least one of the first radiator or the second radiator.

7. The fuel cell system of claim 1, further comprising:
a first cooling line through which a first coolant circulates, the first cooling line being configured to pass through the fuel cell stack;
a first radiator disposed on the first cooling line and configured to cool the first coolant;
a second cooling line through which a second coolant circulates, the second cooling line being configured to pass through a power electronic part;
a second radiator disposed on the second cooling line and configured to cool the second coolant; and
a heat exchanger configured to allow the first coolant and the second coolant to exchange heat with each other,
wherein the pump is disposed on the first cooling line, and
wherein the cooling fan is configured to cool at least one of the first radiator or the second radiator.

8. A method for operating a fuel cell system, the method comprising:
retrieving a preset cooling-fan RPM and a preset pump RPM;
optimizing the cooling-fan RPM and the pump RPM through a decrease of the cooling-fan RPM and an increase of the pump RPM such that a coolant temperature satisfies a specified temperature condition and a total power consumption is minimized, wherein the total power consumption is a sum of a power consumption corresponding to the cooling-fan RPM and a power consumption corresponding to the pump RPM; and
storing the optimized cooling-fan RPM and the optimized pump RPM,
wherein the optimizing of the cooling-fan RPM and the pump RPM includes:
determining whether the coolant temperature at the retrieved cooling-fan RPM and the retrieved pump RPM exceeds a target temperature; and
optimizing the cooling-fan RPM and the pump RPM to lower the coolant temperature to the target temperature or less when the coolant temperature exceeds the target temperature, or optimizing the cooling-fan RPM and the pump RPM such that a difference between the coolant temperature and the target temperature is smaller than or equal to a threshold value and the total power consumption is minimized when the coolant temperature is lower than or equal to the target temperature, wherein the optimizing of the cooling-fan RPM and the pump RPM includes:

decreasing the cooling-fan RPM and increasing the pump RPM when the coolant temperature is lower than or equal to the target temperature;

comparing a first total power consumption corresponding to the decreased cooling-fan RPM and the increased pump RPM with a second total power consumption corresponding to the retrieved cooling-fan RPM and the retrieved pump RPM; and decreasing the cooling-fan RPM and increasing the pump RPM when the first total power consumption is less than the second total power consumption, or determining the retrieved cooling-fan RPM and the retrieved pump RPM to be optimized values when the first total power consumption is greater than or equal to the second total power consumption.

9. The method of claim 8, wherein the optimizing of the cooling-fan RPM and the pump RPM includes:

determining whether the cooling-fan RPM is equal to a specified maximum RPM when the coolant temperature exceeds the target temperature; and optimizing the pump RPM through an increase of the pump RPM such that the coolant temperature satisfies the target temperature when the cooling-fan RPM is equal to the specified maximum RPM.

\* \* \* \* \*